No. 627,015. Patented June 13, 1899.
T. A. SCHLAEBITZ.
FISH HOOK.
(Application filed Sept. 8, 1898.)
(No Model.)
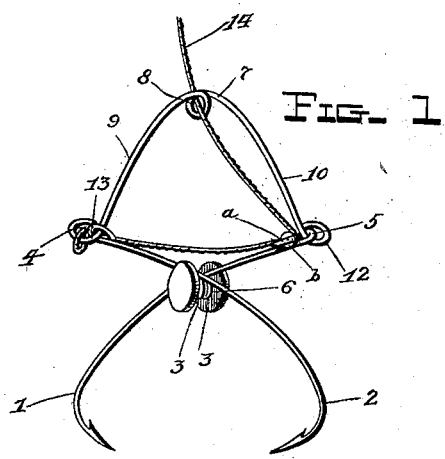
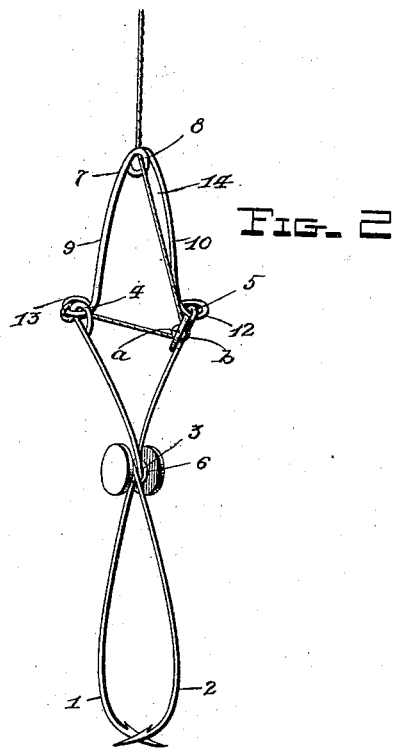
Witnesses
Thomas Geo. Jenkins,
J. A. Wilson
Inventor
Theodore A. Schlaebitz.
by
H. B. Willson & Co
Attorneys
THE NORRIS PETERS CO., PHOTO-LITHO., WASHINGTON, D. C.

UNITED STATES PATENT OFFICE.

THEODORE A. SCHLAEBITZ, OF LINCOLN, NEBRASKA.

FISH-HOOK.

SPECIFICATION forming part of Letters Patent No. 627,015, dated June 13, 1899.

Application filed September 8, 1898. Serial No. 690,475. (No model.)

*To all whom it may concern:*

Be it known that I, THEODORE A. SCHLAE-BITZ, a citizen of the United States, residing at Lincoln, in the county of Lancaster and State of Nebraska, have invented certain new and useful Improvements in Fish-Hooks; and I do declare the following to be a full, clear, and exact description of the invention, such as will enable others skilled in the art to which it appertains to make and use the same.

My invention relates to a novel form of duplex fish-hook; and the object is to provide a simple and effective device of this character.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of the invention as set forth in the claim at the end of this specification.

The same reference characters indicate the same parts of the invention.

In the drawings, Figure 1 is a perspective view of my improved duplex fish-hook set for use. Fig. 2 is a similar view showing the hook sprung.

1 and 2 denote crossed counterpart hooks, each of which is provided with a fulcrum-eye 3 and having their shorter arms formed with the eyes 4 and 5, respectively, and 6 denotes a rivet-bolt, which extends through the fulcrum-eyes on the crossed hooks to hold them together, and the eye 5 is formed with a guide-loop $a$, in which is journaled a grooved guide-roller $b$.

7 represents an A-shaped spring formed with a central guide-eye 8, arranged at a right angle to its diverging arms 9 and 10, which terminate in the closed eyes 12 and 13, which engage the eyes 4 5 on the hooks, and the tension of this spring is exerted to separate the pointed ends of the hooks and retain them in the position shown in Fig. 1.

14 denotes the fish-line, and its free end is first passed through the central guide-eye 8 on the spring 7, thence under the guide-roller $b$ in the loop $a$ on the eye 5 of the hook 2, and its end fixed into the eye 4 on the hook 1, as shown.

When a fish strikes either of the baited hooks, the strain on the line causes it to compress the spring and close the hooks, and thus secure the fish.

Having thus fully described my invention, what I claim as new and useful, and desire to secure by Letters Patent of the United States, is—

In combination, the crossed hooks 1 and 2, formed with the fulcrum-eyes 3 3 and the closed eyes 4 and 5, the rivet 6, the A-shaped spring 7 formed with the guide-eye 8 and the closed eyes 9 and 10 and the line 12 extending through the guide-eye 8 on the spring, and the closed eye 5 on the hook 2, and having its end fixed in the eye 4 on the hook 1, substantially as shown and described.

In testimony whereof I have hereunto set my hand in presence of two subscribing witnesses.

THEODORE A. SCHLAEBITZ.

Witnesses:
GEO. A. HAGENSICK,
ED. C. KUENZEL.